United States Patent [19]
Roth

[11] Patent Number: 5,038,345
[45] Date of Patent: Aug. 6, 1991

[54] TRAFFIC PATTERN INFORMATION FOR A LOCAL AREA NETWORK

[75] Inventor: Jacques A. Roth, San Francisco, Calif.

[73] Assignee: AMP Incorporated, Harrisburg, Pa.

[21] Appl. No.: 428,554

[22] Filed: Oct. 30, 1989

[51] Int. Cl.$^5$ .............................................. H04J 3/24
[52] U.S. Cl. ............................. 370/94.100; 370/60; 340/825.15; 340/825.52
[58] Field of Search ............... 370/60, 94.1, 17, 58.1, 370/58.2, 58.3, 62, 85.1, 85.6, 94.3; 340/825.5, 825.51, 825.52, 825.03, 825.06, 825.07, 825.15, 825.17

[56] References Cited

U.S. PATENT DOCUMENTS

| | | | |
|---|---|---|---|
| 4,491,909 | 1/1985 | Shimizu | 364/200 |
| 4,631,534 | 12/1986 | Franklin et al. | 370/60 |
| 4,674,033 | 6/1987 | Miller | 370/60 |
| 4,720,854 | 1/1988 | Sand | 370/60 |
| 4,872,162 | 10/1989 | Tanaka et al. | 370/94.1 |
| 4,910,655 | 3/1990 | Ashkin et al. | 340/825.07 |
| 4,916,694 | 4/1990 | Roth | 370/94.1 |

OTHER PUBLICATIONS

"Fundamentals of Computer Algorithms", by Ellis Horowitz and Sartaj Sahni, Pittman, pp. 82-94.

Primary Examiner—Douglas W. Olms
Assistant Examiner—Alpus H. Hsu
Attorney, Agent, or Firm—David L. Smith

[57] ABSTRACT

A traffic analyzer (16) for a local area network (10) having multiple stations (14) that exchange message packets (24) receives selected ones of the message packets (24). The analyzer (16) stores a message packet table (TABLE(0)-TABLE(6)) and generates a table pointer (P) as a function of both the source address (S) and the destination address (D) of each received packet (24). A record (S,D,N) of each received packet (24) is stored in the table entry (TABLE(P)) associated with the table pointer value (P) for the respective received packet (24), where N is equal to the number of received packets having the source address S and the destination address D.

11 Claims, 3 Drawing Sheets

| | t1 | t2 |
|---|---|---|
| TABLE (0) | EMPTY | EMPTY |
| TABLE (1) | EMPTY | (10, 9, 2) |
| TABLE (2) | EMPTY | (11, 8, 1) |
| TABLE (3) | EMPTY | EMPTY |
| TABLE (4) | EMPTY | (1, 9, 1).(1, 2, 1) |
| TABLE (5) | EMPTY | EMPTY |
| TABLE (6) | EMPTY | EMPTY |

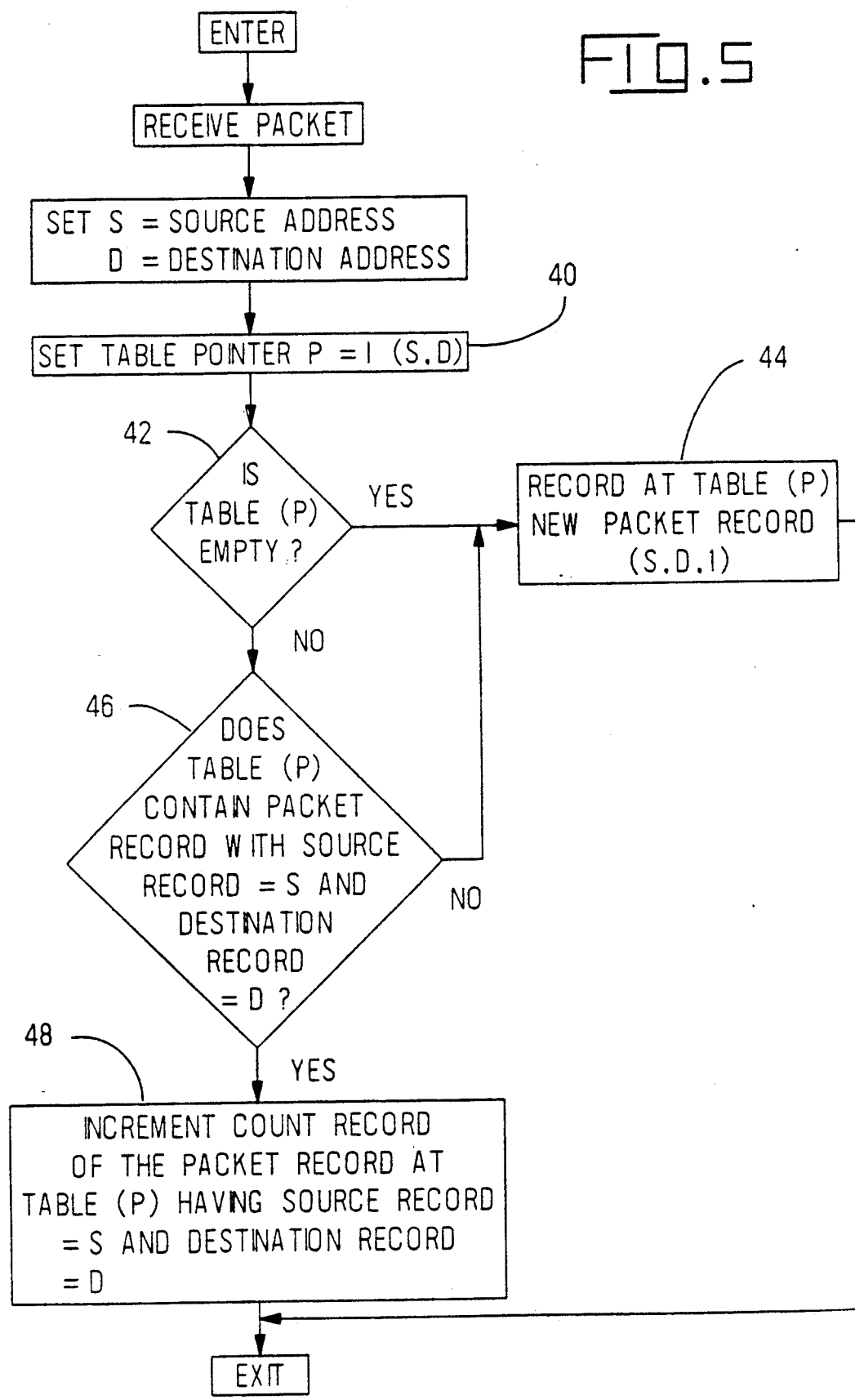

TRAFFIC PATTERN INFORMATION FOR A LOCAL AREA NETWORK

BACKGROUND OF THE INVENTION

This invention relates to traffic analyzers for local area networks, and in particular to traffic analyzers that record information regarding traffic patterns between stations on a transmission medium included in a local area network.

A local area network typically includes a number of stations, each having a respective address, interconnected by a transmission medium. For example, a suitable transmission medium may be a fiber optic cable, a twisted pair, or a radio link. Typically, each of the stations in the network includes means for sending message packets to selected other stations in the network via the transmission medium, as well as means for receiving message packets. Each message packet will generally include both the source address (identifying the sending station) and the destination address (identifying the intended receiving station), as well as the data being transmitted.

In the past, statistics regarding the patterns of traffic between individual pairs of stations have been collected by means of a traffic monitor that includes a computer programmed to monitor message packets on the transmission medium. To do this, each packet is examined and information is stored indicative of the number of packets sent between each active pair of stations.

There may be a great number of packets sent on a network, and certain networks include a large number of active pairs of stations communicating with one another. For these reasons, substantial computer time or hardware may be required to efficiently store traffic patterns between pairs of active stations. For example, if table entries indicative of the source address, destination address, and number of packets exchanged were simply stored in an unordered list, searching the list and inserting new entries into the table as appropriate could be very time consuming. If the method for searching the table were linear, on average half of the entries of the table would have to be searched for every packet received. A sorted table would allow for a binary search method, but then adding a new entry to the table for a new source and destination pair would be slow, requiring that a considerable amount of data in the table be moved for each newly active source-destination pair of stations.

It is one object of the present invention to provide an improved system for recording information regarding traffic patterns between stations on a transmission medium, which system does not require excessive memory or computer time to implement, yet which is highly efficient and effective in use, even with large networks where a large number of message packets are being monitored.

SUMMARY OF THE INVENTION

The traffic analyzer of this invention is used with a local area network of the type comprising a plurality of stations, each having a respective address, and a transmission medium interconnecting the stations, wherein a first set of the stations each comprise means for sending message packets to selected other ones of the stations via the transmission medium, and wherein a second set of the stations each comprise means for receiving the message packets.

According to this invention, the traffic analyzer comprises means for receiving selected ones of the message packets and for determining the source address and destination address associated with each received message packet. Means are provided for maintaining a message packet table comprising a plurality of table entries, and for generating a table pointer as a function of both the source address and the destination address of each of the received packets such that each value of the table pointer is associated with a respective one of the table entries. The traffic analyzer also includes means for storing a record of each of the received packets in the table entry associated with the table pointer value for the respective received packet. This invention is also directed to the method implemented by the system described above.

Because both the source and destination addresses are used to calculate the table pointer, the appropriate table entry can be found quickly and reliably, without an extensive search, and without moving an extensive amount of data in memory to accommodate a new table entry. In this way, hardware requirements are minimized in an efficient system which can tabulate traffic information in real time efficiently, even with large networks having many stations transmitting a large number of packets.

BRIEF DESCRIPTION OF THE DRAWINGS

FIG. 5 is a flow chart of a routine executed by the traffic analyzer of FIG. 4.

DESCRIPTION OF THE PREFERRED EMBODIMENTS

Figure 1:
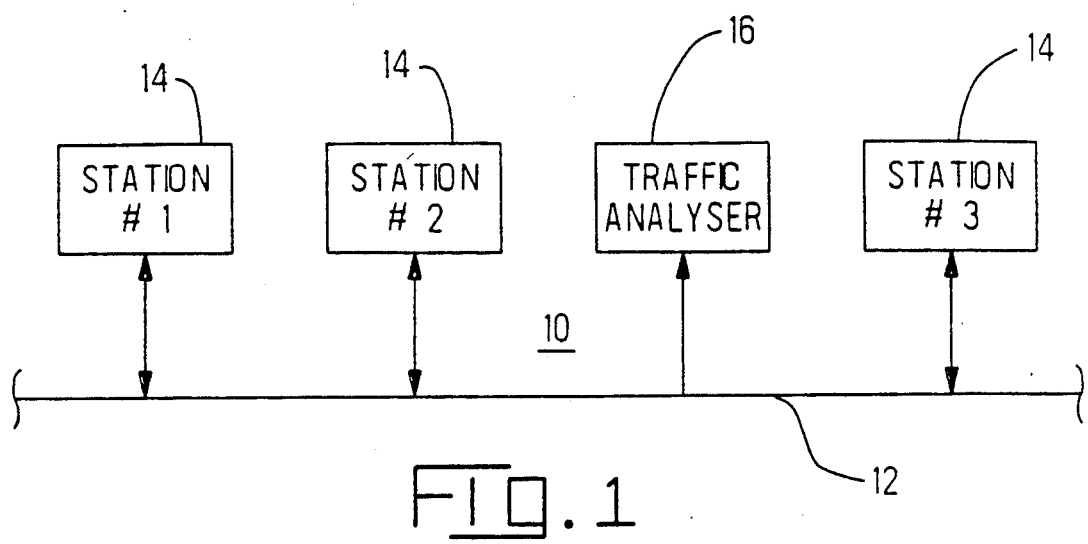
FIG. 1 is a block diagram of a local area network which incorporates a traffic analyzer that includes a preferred embodiment of this invention.

Turning now to the drawings, FIG. 1 shows a block diagram of a local area network 10 which includes a transmission medium 12 that in this embodiment is a fiber optic cable. Of course, the transmission medium 12 can be implemented with conductors such as a twisted pair, or can comprise a radio link. A plurality of stations 14 are coupled to the transmission medium 12, and in this embodiment each of the stations 14 is characterized by a respective address. Purely by way of example, in the portion of the local area network 10 shown in FIG. 1, the stations 14 are numbered with addresses 1, 2 and 3.

Figure 2:
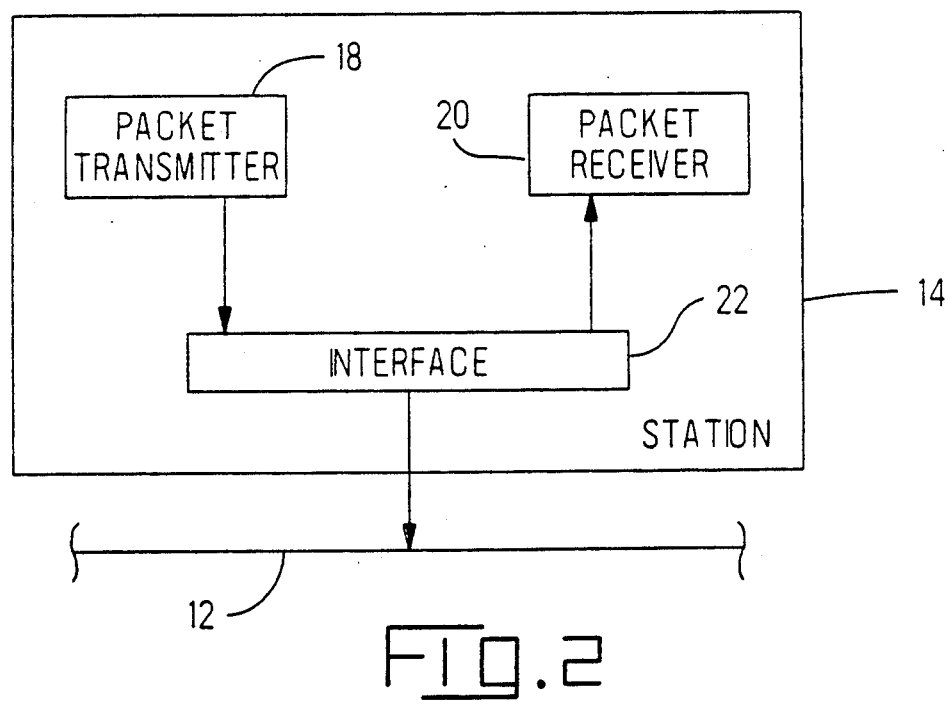
FIG. 2 is a block diagram of one of the stations included in the local area network of FIG. 1.

FIG. 2 shows a block diagram of one of the stations 14, which includes an interface 22 coupled to the transmission medium 12, a packet sending means or transmitter 18 and a packet receiving means or receiver 20.

Figure 3:
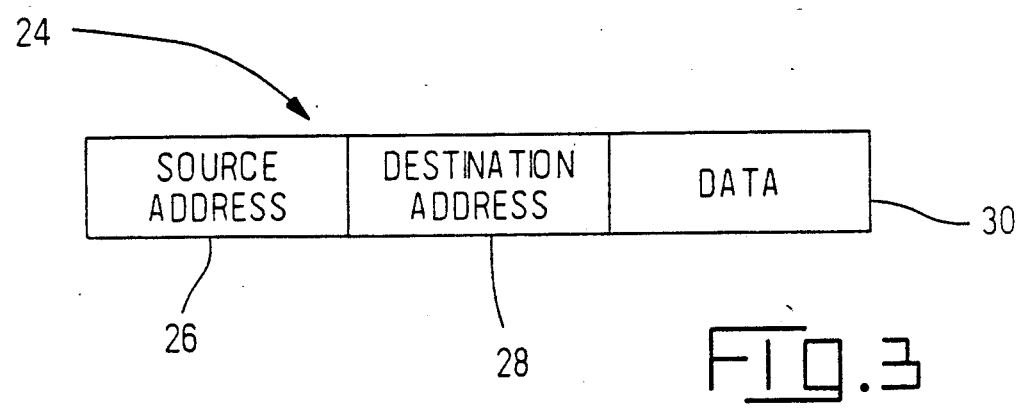
FIG. 3 is a schematic diagram of a packet transmitted by one of the stations of the local area network of FIG. 1.

FIG. 3 shows in schematic form one of the message packets 24 sent or received by one of the stations 14. Each packet 24 includes a source address 26, a destination address 28, and data 30 being transmitted. Typically, the source address 26 is the address of the station 14 sending the packet 24 and the destination address 28 is the address of the station 14 intended to receive the packet 24.

Local area networks 10 including the features described above are well known to those skilled in the art and have been described here merely to clarify the environment in which the presently preferred embodiment operates. For this reason, further details will not be provided here.

Figures 4, 6:
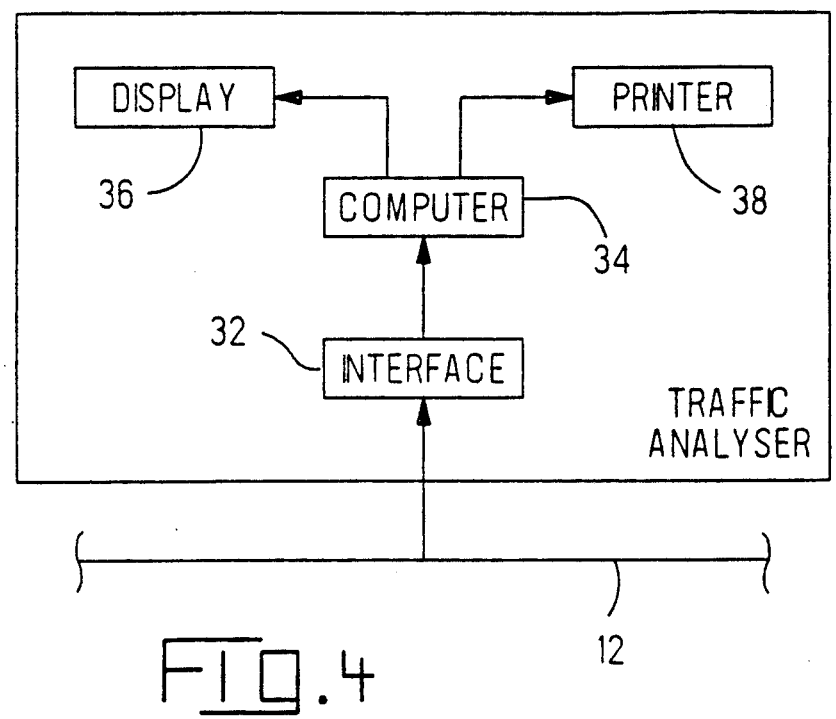
FIG. 4 is a block diagram of the traffic analyzer of FIG. 1.
FIG. 6 is a chart illustrating operation of the routine of FIG. 5.

According to this invention, a traffic analyzer 16 is also coupled to the transmission medium 12 to receive message packets transmitted thereon. FIG. 4 shows a block diagram of the traffic analyzer 16, which includes an interface 32 coupled to the medium 12 to receive message packets. The received message packets are supplied by the interface 32 to a computer 34 which records information indicative of the pattern of traffic on the medium 12. The computer 34 in turn is coupled to a display 36 and a printer 38 which can be used to display or print information regarding traffic on the medium 12.

Those skilled in the art will recognize that the traffic analyzer 14 can readily be implemented using standard hardware. For example, the traffic analyzer 16 can use an adapter of the type distributed by NETROUNIX as Model No. PNA-101 for the interface 32, and an IBM PC computer for the computer 34.

As pointed out above, one important traffic parameter which is useful in analyzing operation of the local area network 10 is a tabulation of the total number of message packets exchanged between each active pair of stations 14. For example, such a tabulation would indicate how many packets each station 14 had sent to each of the other stations 14 in the network 10.

The computer 34 is programmed to execute the routine flow charted in FIG. 5 to record this information efficiently in real time with minimum hardware requirements. As shown in FIG. 5 the first step in this routine is to receive a new packet from the interface 32. The program then sets two variables S and D. S is set equal to the source address 26 and D is set equal to the destination address 28 of the particular packet 24 being processed (FIG. 3).

In block 40 the routine then computes a table pointer P as a function $I(S,D)$ of S and D. The function can vary widely, as well known to those skilled in the art, and the particular function suitable for any application will vary with the size of the table.

Once the table pointer P has been determined as a function of both the source address 26 and the destination address 28, the table pointer P is used to find the corresponding table entry TABLE(P). This table entry TABLE(P) is then examined in block 42 to determine if it is empty. If so, block 44 is executed, in which a new packet record equal to (S,D,N) is recorded at TABLE(P). This packet record is made up of three parts, a source record, a destination record, and a count record. The source record (equal to S in this example) is indicative of the source address 26 for the respective packet 24. Similarly, the destination record (equal to D in this example) is equal to the destination address 28 of the respective packet 24. The count record N (equal to 1 in this example) is indicative of the total number of packets sent from source address S to destination address D.

If the routine determines in block 42 that TABLE(P) is not empty, the routine then checks to determine whether TABLE(P) contains a packet record with the source record equal to S and the destination record equal to D. If not, a new packet record equal to (S,D,1) is recorded at TABLE(P). Alternately, if TABLE(P) does contain a packet record with the source record equal to S and the destination record equal to D, the routine then increments the count record of the associated packet record in block 48. The routine then returns and waits to process the next received packet.

FIG. 6 will be used to illustrate the operation of the routine of FIG. 5 in a highly simplified example, which uses an unusually small table and an unusually simple function $I(S,D)$. In this example the table maintained by the routine of FIG. 5 includes seven entries, TABLE(0)-TABLE(6). At the start time t1 of a monitoring period each of these table entries is empty, as shown in column t1 in FIG. 6. During the monitoring period (which ends at time t2) five message packets are sent as follows:

Source Address 10 sends a packet to Destination Address 9;

Source Address 11 sends a packet to Destination Address 8;

Source Address 1 sends a packet to Destination Address 9;

Source Address 10 sends a packet to Destination Address 9;

Source Address 1 sends a packet to Destination Address 2.

In this example the function I is defined as $I(S,D) = (100S + D) \bmod 7$.

For the first packet, P equals $(100 \times 10 + 9) \bmod 7 = 1$ and TABLE(1) is revised to record the packet record (10,9,1), indicating that Station 10 sent a message packet to Station 9 and that this is the first such message packet.

The second packet results in $P = (11 \times 100 + 8) \bmod 7 = 2$, and TABLE(2) is changed to (11,8,1).

For the third message packet $P = (1 \times 100 + 9) \bmod 7 = 4$, and TABLE(4) is changed to (1,9,1).

The fourth packet is a second packet from Station 10 to Station 9. For this reason P is again equal to 1 and the routine finds that TABLE(1) includes an entry (10,9,1) and increments the count record to 2 such that the packet record now equals (10,9,2).

The final packet to be received before time t2 results in P=4. In block 46, the routine determines that TABLE(4) includes a first packet record (1,9,1) but that the source and destination records of this packet record are not equal to 1 and 2, respectively. For this reason, a second packet record (1,2,1) is stored at TABLE(4).

At time t2 after the five packets described above have been received and processed, the TABLE(0)-TABLE(6) contain the values shown in column t2 of FIG. 6.

In this way, a complete record of the source and destination addresses of packets on the medium 12 is recorded, without time consuming searching through the entire table, and without shifting records in order to preserve an ordered table suitable for a binary search. The table has a fixed number of entries TABLE(0)-TABLE(6), and thus does not require an excessive amount of memory to store a large number of empty entries. In this way hardware requirements are minimized while high speed operation is insured to allow the traffic monitor to tabulate packets on a real time basis.

The invention is not limited to the specific example described above. For example, in some applications the source and destination addresses may not be included as part of the message packet, but may be determined by the traffic analyzer in some other way. The hardware used to implement the method and apparatus of this invention can be varied widely, as can the details of the local area network with which it is used.

I claim:

1. In a traffic analyzer for a local area network of the type comprising a plurality of stations, each having a respective address, and a transmission medium interconnecting the stations, wherein a first set of the stations each comprise means for sending message packets to selected other ones of the stations via the transmission medium, and wherein a second set of the stations each comprise means for receiving the message packets, an improved apparatus for recording information regarding traffic patterns on the transmission medium comprising:

means for receiving selected ones of the message packets;
means for determining a source address indicative of the address of the station sending each of the received message packets;
means for determining a destination address indicative of the address of the intended receiving station for each of the received message packets;
means for maintaining a message packet table comprising a plurality of table entries;
means for generating a table pointer as a function of both the source address and the destination address of each of the received packets such that each value of the table pointer is associated with a respective one of the table entries; and
means for storing a record of each of the received packets in the table entry associated with the table pointer value for the respective received packet.

2. The invention of claim 1 wherein the first set includes all of the stations, and wherein the second set includes all of the stations.

3. The invention of claim 1, wherein the record storing means comprises means for storing a plurality of packet records, each packet record comprising a source record indicative of the respective source address, a destination record indicative of the respective destination address, and a count record indicative of the number of received message packets sent from the source address station to the destination address station.

4. The invention of claim 3 wherein the packet record storing means comprises:

means for comparing the source and destination addresses of each received packet with the source and destination records of each packet record stored in the table entry associated with the respective table pointer value;
means, operative in the event the comparing means fails to find a packet record in the respective table entry having source and destination records matching the respective source and destination addresses, for creating a new packet record in the respective table entry; and
means operative in the event the comparing means finds a packet record in the respective table entry having source and destination records matching the respective source and destination addresses, for incrementing the count record of the respective packet record.

5. In a traffic analyzer for a local area network of the type comprising a plurality of stations, each having a respective address, and a transmission medium interconnecting the stations, wherein a first set of the stations each comprise means for sending message packets to selected other ones of the stations via the transmission medium, wherein a second set of stations each comprise means for receiving the message packets, and wherein each of the message packets comprises a source address and a destination address, an improved apparatus for recording information regarding traffic patterns on the transmission medium comprising:

means for receiving selected ones of the message packets;
means for storing a message packet table comprising a plurality of table entries;
means for generating a table pointer as a function of both the source address and the destination address of each of the received packets such that each value of the table pointer is associated with a respective one of the table entries; and
means for storing a record of each of the received packets in the table entry associated with the table pointer value for the respective received packet.

6. The invention of claim 5 wherein the first set includes all of the stations, and wherein the second set includes all of the stations.

7. The invention of claim 5, wherein the record storing means comprises means for storing a plurality of packet records, each packet record comprising a source record indicative of the respective source address, a destination record indicative of the respective destination address, and a count record indicative of the number of received message packets sent from the source address station to the destination address station.

8. The invention of claim 7 wherein the packet record storing means comprises:

means for comparing the source and destination addresses of each received packet with the source and address records of each packet record stored in the table entry associated with the respective table pointer value;
means operative in the event the comparing means, fails to find a packet record in the respective table entry having source and destination records matching the respective source and destination addresses, for creating a new packet record in the respective table entry; and
means, operative in the event the comparing means finds a packet record in the respective table entry having source and destination records matching the respective source and destination addresses, for incrementing the count record of the respective packet record.

9. A method for recording information regarding traffic patterns in a local area network of the type comprising a plurality of stations, each having a respective address, and a transmission medium interconnecting the stations, wherein a first set of the stations each comprise means for sending message packets to selected other ones of the stations via the transmission medium, wherein a second set of the stations each comprise means for receiving the message packets, said method comprising the following steps:

receiving selected ones of the message packets;
determining a source address indicative of the address of the station sending each of the received message packet and a destination address indicative of the address of the intended receiving station for each of the received message packets;

maintaining a message packet table comprising a plurality of table entries;

generating a table pointer as a function of both the source address and the destination address of each of the received packets such that each value of the table pointer is associated with a respective one of the table entries, and storing a record of each of the received packets in the table entry associated with the table pointer value for the respective received packet.

10. The method of claim 9 wherein the storing step comprises the step of storing a plurality of packet records, each packet record comprising a source record indicative of the respective source address, a destination record indicative of the respective destination address, and a count record indicative of the number of received message packets sent from the source address station to the destination address station.

11. The method of claim 10 wherein the packet record storing step comprises the following steps:

comparing the source and destination addresses of each received packet with the source and destination records of each packet record stored in the table entry associated with the respective table pointer value;

creating a new packet record in the respective table entry in the event the comparing step fails to find a packet record in the respective table entry having source and destination records matching the respective source and destination addresses; and incrementing the count record of the respective packet record in the event the comparing step finds a packet record in the respective table entry having source and destination records matching the respective source and destination addresses.

* * * * *